United States Patent Office 3,027,928
Patented Apr. 3, 1962

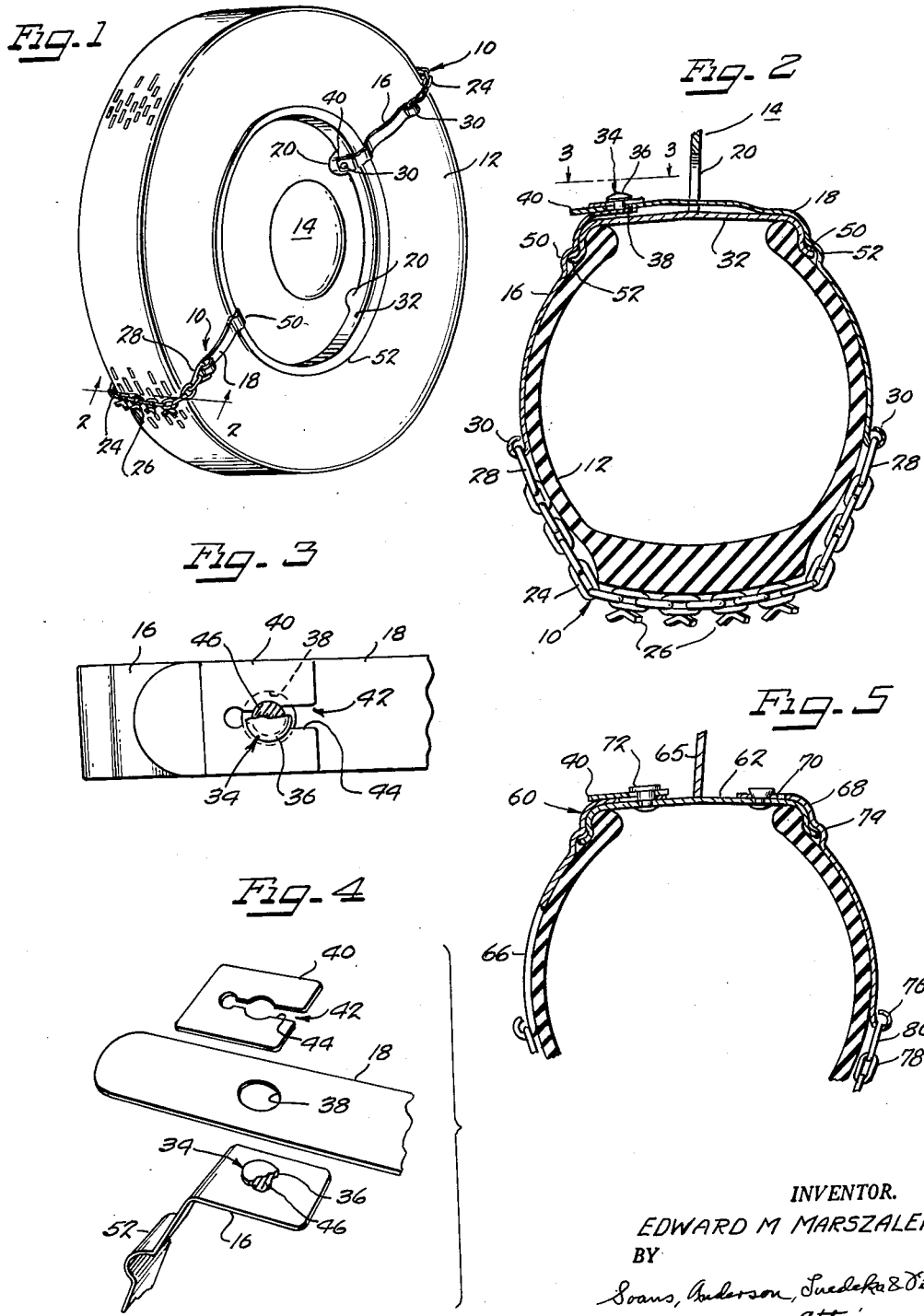
INVENTOR.
EDWARD M MARSZALEK

3,027,928
ANTI-SKID DEVICE FOR VEHICLE WHEELS
Edward M. Marszalek, 5825 S. Kilbourn Ave.,
Chicago, Ill.
Filed June 20, 1960, Ser. No. 37,240
4 Claims. (Cl. 152—237)

This invention relates to improvements in anti-skid devices in the form of a tire chain which may be readily applied to vehicle wheels to prevent slipping and skidding of the vehicle on slippery surfaces.

It is a principal object of the invention to provide an anti-skid device of simplified construction, which is readily attachable to a vehicle wheel and which is extremely durable so that it may be retained on the wheel for a considerable period of time without appreciable wear. A further object of the invention is to provide an anti-skid device, wherein the traction means is replaceably mounted on a pair of durable, flexible metal straps which are adapted to engage the wheel in a manner such that they resist the normal tendency to shift along the periphery of the wheel. Still another object is to provide a tire chain of the type referred to above, which may be mounted on the tire rim of a disc-type wheel having no openings through the disc.

Other objects and advantages will become apparent from the following description of the selected embodiments which are illustrated in the accompanying drawings, wherein:

FIGURE 1 is a perspective view of a vehicle wheel having mounted thereon a pair of tire chains embodying features of the present invention;

FIGURE 2 is an enlarged cross-sectional view taken along the line 2—2 in FIGURE 1;

FIGURE 3 is a fragmentary, plan view, taken along the line 3—3 in FIGURE 2, showing the connecting means for the tire chain;

FIGURE 4 is an exploded perspective view of the connecting means seen in FIGURE 3; and FIGURE 5 is a fragmentary, sectional view, similar to FIGURE 2, of a vehicle wheel having mounted thereon a modified form of tire chain embodying certain of the features of this invention.

With reference to the drawings, it will be seen that the embodiment of the invention shown in FIGURES 1 through 4 comprises generally a tire chain 10, which is adapted to be placed around the tire 12 mounted on the vehicle wheel 14, with the upper end portion comprising a pair of metal straps 16 and 18, the end of the latter strap passing through an opening 20 in the wheel disc for locking engagement with the end portion of the other strap 16. The tire chain 10 is shaped generally to conform with the shape of a vehicle tire and mounting rim, and the intermediate portion, which is disposed for positioning on the tread of the tire, is provided with a traction producing means in the form of a chain 24, or the like. More particularly, the traction means provided on the intermediate tread portion of the device comprises a chain having V-shaped cleats 26 welded thereto, and the end links of the chain are each connected with a generally triangularly shaped link 28 having its base portion received in a rebent end portion 30 on the straps 16 and 18. Preferably, the links 28 are split transversely of their base portion to permit opening of the link to remove the chain 24 from the metal straps 16 and 18. The metal straps 16 and 18 are preferably of a tempered, flexible steel and are sufficiently wide, about 1 inch or more, to avoid twisting, and yet the straps should be narrow enough to pass through the ordinary opening provided between the hub or disc and the rim of modern automobile wheels.

The strap portions 16 and 18 of the device 10 are adapted to overlie the wheel rim 32, and the strap 18 includes an elongated end section which is adapted to be passed through the opening 20 in the wheel disc and disposed in overlapping relation to the shorter end section on the other strap 16. The shorter strap 16 has secured thereto, adjacent its upper end, a locking rivet 34, or the like, which includes a projecting intermediate section of reduced diameter and a head portion 36 which is adapted to be received through an opening 38 in the end of strap 18. The opening 38 is shown as being circular, but it may be formed as an elongated slot in order to allow for variations in the tire size. A steel safety washer or shim 40, such as is shown in FIGURE 4, is employed to insure positive locking of the strap ends together. More particularly, the shim 40 is forced between the rivet head 36 and the underlying strap end, to thereby frictionally hold the two strap ends together at the locking rivet connection. The shim 40 is of relatively thin metal and includes a keyhole 42 formed therein presenting an enlarged opening at one end to permit entry of the projecting intermediate section of the locking stud 34. Furthermore, the inner end section of the slot portion 44 of the keyhole 42 is preferably slightly less in width than the diameter of the stud shank 46, in order that the shim 40 must be forced in place with the circular portion of the keyhole 42 engaging the stud shank 46. The shim 40 is sufficiently thin and flexible to accommodate spreading of the keyhole and permit the described engagement and, also, to release the stud or rivet 34 from engagement by the shim.

As noted particularly in FIGURE 2 of the drawings, the straps 16 and 18 are curved to conform generally with a vehicle tire wall and terminate in the rebent end portions 30 which provide for connection with the chain 24. An intermediate portion of each of the straps, adjacent the position of the bend therein, includes a transversely extending, generally arcuate shaped rib 50, which is adapted to engage and grip the peripheral portion 52 of the wheel rim, which generally includes a lip or bead projecting outwardly of the rim. The disposition of the rib 50 in overlying engagement with the edge 52 of the wheel rim and in gripping relation to the adjacent portion of the tire wall provides a very effective means for resisting the normal tendency of the tire chain to roll along the tire and twist as it is subjected to traction forces in the direction of movement of the wheel. The rib 50 locks the straps in position on the rim and along the tire wall to prevent movement thereof relative to the wheel. Furthermore, the lower end portions 30 of the straps being disposed a substantial distance below the rim, preferably more than half the height of the tire as noted in FIGURE 2, and being relatively wide and having a fairly snug fit with the connecting links 28 are designed to further prevent any substantial movement of the chain 24 relative to the tire.

A modified form of the invention is illustrated in FIGURE 5, wherein there is shown an anti-skid device 60 which is adapted for mounting on the rim 62 of a vehicle wheel, which may be similar to wheel 14 in FIGURE 1 or it may be of a type having a continuous connection between the hub or disc 65 and the rim 62 with no openings, such as is seen at 20 in FIGURE 1. The tire chain 60 is mounted in a manner eliminating the need for complete transverse encirclement of the rim and tire. Again, the strap portions 66 and 68 of the tire chain are of flexible metal, such as tempered stainless steel, but in this instance the free ends of the metal straps terminate in spaced relation to each other on opposite sides of the hub 65. Each of the end sections is provided with an opening 70, at least one of which is preferably slotted for adjustment purposes, and each of these openings is adapted to receive a suitable fastening means for securing the end of the strap to the rim 62 on opposite sides of the wheel disc 65. In the illustrated structure, there is provided a pair of locking rivets or studs 72 which may be either removably or fixedly mounted on the wheel rim 62. The openings 70 on the ends of the straps 66 and 68 engage these studs to thereby fix the saddle in position on the tire. At least one end of the tire chain 60 is secured in position on the rim by means of the shim or safety washer 40 described above with respect to FIGURE 4.

The straps 66 and 68 include rib portions 74 for gripping the outer periphery of the rim 62, in the manner described with respect to the embodiment of FIGURES 1–4, and the lower end portions of the metal straps are rebent to provide a loop-like projection 76. A link chain section 78 is detachably mounted along the lower end of the straps 66 and 68 by attachment of opposite ends of the chain to the loops 76, through means of a split link 80 similar to link 28 above. The chain 78 is preferably of case hardened steel to insure longer wear.

Although shown and described with respect to particular embodiments and materials, it will be apparent that various modifications might be made without departing from the principles of this invention. This application is a continuation-in-part of my pending application Serial No. 836,267, filed August 26, 1959, now abandoned.

I claim:

1. An anti-skid device for use with a tire mounted on a vehicle wheel rim, comprising a pair of metal straps adapted to extend along the opposite side walls of the tire at positions inwardly of the tread portion thereof, each of said straps being angularly bent intermediate the ends thereof with one portion of the strap shaped generally to conform with the contour of the side wall of a tire and the other portion of the strap being adapted to closely overlie the generally horizontal transverse portion of a wheel rim, each of said straps including in said one portion a transverse rib defining an axially inwardly facing groove which is adapted to closely grip the peripheral edge of a wheel rim and thereby prevent movement of the strap circumferentially of the tire, a flexible metal traction means interconnecting said one portion of said strap members and adapted to overlie the tread portion of the tire in closely fitting relation thereto, the free ends of said other portions of the straps being adapted to overlap, when positioned with said grooves engaging the wheel rim, and means for detachably interconnecting said overlapping end portions of said straps comprising an opening in one of said end portions and a projecting rivet fixed to the other of said overlapping end portions in position for engagement with the opening in said one end portion, and a locking means adapted to be wedged between the head of said rivet and said one end portion to thereby secure said straps in position relative to each other.

2. An anti-skid device in accordance with claim 1, wherein said locking means comprises a plate member having an opening therein which extends from an intermediate portion of the plate to one edge thereof.

3. An anti-skid device in accordance with claim 1, wherein said flexible, metal traction means is connected to each of said straps by means including a loop formed in the free end of said one portion of said strap, and an expansible, split link which is secured to the flexible traction means and extends through said loop.

4. An anti-skid device according to claim 1, wherein said flexible metal traction means comprises a chain having V-shaped cleats fixed thereto in position for outwardly projecting relation to the vehicle tire tread.

References Cited in the file of this patent

UNITED STATES PATENTS

| | | |
|---|---|---|
| 1,235,575 | Kliesrath et al. | Aug. 7, 1917 |
| 1,331,391 | Smith | Feb. 17, 1920 |
| 1,394,312 | Leech | Oct. 18, 1921 |
| 1,456,473 | Summerfield | May 22, 1923 |
| 1,535,620 | Morgan | Apr. 28, 1925 |
| 2,212,450 | Paschke | Aug. 20, 1940 |